UNITED STATES PATENT OFFICE.

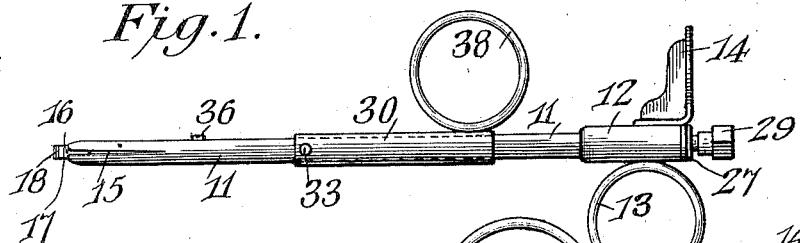
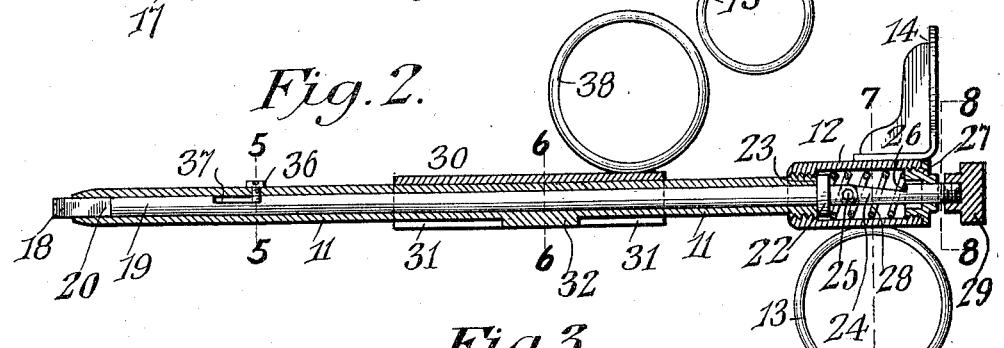
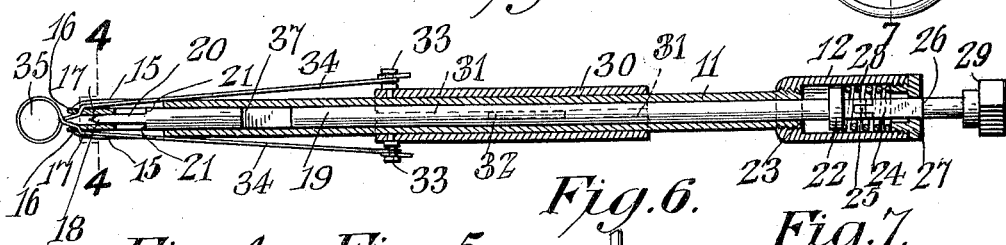
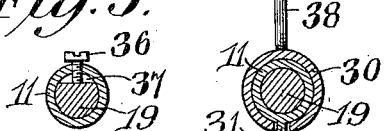
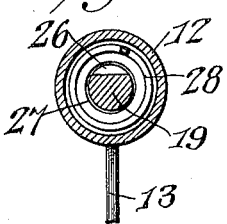
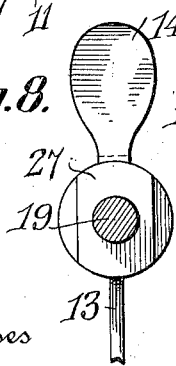

WALTER BURR STRUBLE, JR., OF PORTLAND, OREGON.

DENTIMETER.

1,036,927.   Specification of Letters Patent.   Patented Aug. 27, 1912.

Application filed September 5, 1911. Serial No. 647,675.

*To all whom it may concern:*

Be it known that I, WALTER BURR STRUBLE, Jr., a citizen of the United States, residing at Portland, in the county of Multnomah and State of Oregon, have invented a new and useful Dentimeter, of which the following is a specification.

This invention relates to a dentimeter, or an instrument adapted for use by dentists in measuring the exact circumference of a tooth to determine the size of a crown that may be required.

The principal object of the invention is the production of an instrument equipped with means for holding a strip of measuring wire or other material in a looped position, and also provided with a cutting device, which is adapted to be retracted when the measuring material is being stretched around the tooth, whereby when said measuring material is drawn tightly around a tooth, the cutting device is operated to sever said material at the crossing point thereof, thus obtaining a piece of measured material the exact circumference of the tooth.

With this and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of my device complete with the parts shown on a smaller scale than in the remaining figures. Fig. 2 is an enlarged vertical longitudinal sectional view with the cutter projected. Fig. 3 is an enlarged longitudinal horizontal sectional view of my device with the looped measuring material in position and the cutter retracted. Fig. 4 is a section on the line 4—4 of Fig. 3. Fig. 5 is a section on the line 5—5 of Fig. 2. Fig. 6 is a section on the line 6—6 of Fig. 2. Fig. 7 is a section on the line 7—7 of Fig. 2. Fig. 8 is a section on the line 8—8 of Fig. 2. Fig. 9 is an enlarged sectional view of the outer end of the instrument showing the openings through which the measuring material is threaded. Fig. 10 is a modified form of the outer end of the instrument. Fig. 11 is a view of a modification of the casing.

Similar numerals of reference refer to corresponding parts in all the figures of the drawing.

Referring to the drawing, 11 designates a tubular member or guide casing open at both ends, and provided on its inner end with an enlarged tubular portion or cylindrical chamber 12 to which is secured a pair of laterally extending rigidly mounted finger and thumb pieces 13 and 14, the former projecting downwardly and the latter extending upwardly. The outer end of the casing is tapered inwardly and is provided at said end with laterally spaced longitudinally extending inwardly tapering slots 15, the outer or deeper ends of which communicate and register with openings 16 in the outer ends of guide blocks 17, which are rigidly secured within the casing and project slightly beyond the end of the same. The guide blocks 17 are positioned within the end of the casing 11, with the openings 16 in alinement with the slot 15, as shown in Fig. 4, and act as a guide for a cutting knife 18, formed on the outer end of a plunger rod 19, which is slidably mounted within the casing or guide 11. The rod 19 is longer than the tube or casing 11, but substantially the same diameter as the bore thereof, and is provided at its outer end with a contracted portion 20 terminating in the beveled knife 18. The contracted portion 20 is preferably formed by reducing the sides of the rod 19, thereby forming shoulders 21 thereon, which are adapted to abut against the inner squared ends of the guide blocks 17 when the rod 19 is in its extended position. (See Fig. 2). The rod 19 is provided adjacent its inner end with an annular flange or collar 22, which, when the rod is in its extended position, abuts against a shoulder 23 formed at the junction of the casing 11 and the enlarged portion or chamber 12.

24 designates a trigger pivotally connected to the inner end of the rod 19, in rear of the flange or collar 22 by a pivot 25, and it is provided on its upper side with a longitudinally extending shouldered cut-out or notch 26. The end of the trigger 24 is preferably screw threaded to receive a thumb nut 29 which serves as an operating knob or handle.

27 is an externally threaded nut adapted to engage with screw threads on the inner side of the enlarged portion or chamber 12 and thereby close the end of the same. The nut 27 is provided in its center with an opening through which the trigger 24 extends, the shoulder of the cut-out or notch 26 on said trigger being adapted to engage the outer wall of the nut when said trigger is in a retracted position. The nut 27 is flattened at two sides to provide a wrench-engaging portion, as shown in Fig. 8.

A coiled spring 28 is mounted within the enlarged portion or chamber 12 and encircles the trigger 24, one end of the spring resting against the outer face of the flange or collar 22 on the inner end of the rod 19, and the other bearing against the nut 27. It will be observed that by this arrangement there is at all times a spring pressure which tends to force the knife 18 beyond the end of the guide casing 11, as shown in Fig. 2.

Slidably mounted on the casing 11 is a sleeve 30 which is provided on its underside with a longitudinal slot 31, through which is adapted to pass a lug or guide 32, securely fastened to the underside of the casing 11, said lug serving to guide the sleeve in moving the same on the casing. Secured to the opposite sides of the outer end of the sleeve 30 and in longitudinal alinement with the grooves 15 of the casing 11 are two laterally extending lugs 33, around which are adapted to be wound the terminals of a measuring strand or wire 34, after it has been threaded through the openings 16 in the guides 17 and formed into the loop 35 as shown in Fig. 3. The inward sliding movement of the sleeve 30 is limited by the enlarged portion 12, and its outward movement by the head of the screw 36, which projects through a suitable opening in the upper side of the casing 11 near the outer end thereof. The said screw engages with a cut-out portion 37 in the upper side of the sliding rod 19, limiting the inward movement of said rod. A finger hold 38 is provided on the upper side of the sleeve 30 near its inner end, the same being approximately in longitudinal alinement with the thumb piece 14 on the enlarged portion 12.

The inner edges of the guide blocks 17, to admit of a tight pull of the measuring wire over the same, may be beveled adjacent the cutting knife 18, as shown at 39 in Fig. 9; or the guides may be provided with flat faces and laterally extending flanges 40 with openings 41, adapted to receive the measuring material, as shown in Fig. 10.

The operation of the device is as follows:—The knife is first brought to its retracted position by grasping the thumb nut 29, and pulling on the same against the tension of coiled spring 28 until the shoulder of the cut-out or notch 26 engages with the outer wall of the nut 27. The sleeve 30 is now slid forward against the head of the screw 36, and a strand of measuring material or wire 34 has one end inserted through each of the openings 16 in the guide block 17, forming a crossed loop 35 at the outer end thereof. The ends of the wire 34 are now brought through the grooves 15 and wrapped around the lugs 33. Grasping the instrument with the tip of the thumb against the piece 14, the index finger through the finger hold 38 of the sleeve 30, and the middle finger through the finger hold 13, the loop 35 is slipped over the tooth to be measured, care being exercised to keep the wire crossed as in Fig. 3. The loop is then drawn tightly around the tooth by a slight pull rearwardly of the index finger on the finger hold 38. When the wire is drawn as tightly as desired around the tooth, and the projecting beveled ends 39 of the guide blocks 17 are pressing the wire against the tooth, the thumb is moved downwardly along the piece 14, contacting with the nut 29 and disengaging the trigger from the nut 27, allowing the spring 28 to force the knife 18 with sufficient force against the loop 35 at the crossing thereof, to sever the same from the rest of the wire attached to the implement. The severed loop remaining on the tooth will be the exact circumference of the tooth, and may be removed and utilized to measure the length of material necessary for the crown.

So far as I am aware it is new to provide an instrument of this character with means for cutting the wire after the loop has been formed and tightened about the tooth. It is also new to provide slots in the outer casing which register with openings in guide blocks, by which means the wire can be pulled tight about the tooth before it is cut.

In the modification shown in Fig. 11, the casing is provided at its front end with outwardly turned lugs 42 which are perforated to allow for the passage of the wire. In this form the guide blocks 17 are eliminated, as the casing itself will form a guide for the plunger.

Having thus fully described my invention, what I claim as new and desire to secure by Letters Patent, is:—

1. In a measuring instrument, means for guiding a strand in a loop about the object to be measured, in combination with independently operable means carried by the instrument for severing the loop.

2. In a measuring instrument, means to guide a strand about the article to be measured with the strand crossed to form a loop, in combination with independently operable means mounted on the instrument to sever the loop at the crossing point of the strand.

3. In a measuring instrument, means to guide and hold a strand in a loop about the article to be measured, and independently operable means to draw on the strand to tighten the loop, in combination with means to sever the loop from the strand.

4. In a measuring instrument, means to guide and hold a strand in a loop about the article to be measured, and means to draw on the strand to tighten the loop, in combination with a reciprocating cutter mounted on the instrument, and means to propel the cutter against the strand to sever the loop.

5. In a measuring instrument, means to guide a strand about the article to be measured with the strand crossed to form a loop, in combination with a reciprocating cutter movable to and from a set position, means normally tending to propel the cutter against the strand at the crossing point to sever the loop, and trigger mechanism to hold the propelling means inactive.

6. In a dentimeter, the combination of a hollow casing open at both ends and having wire guiding means at the outer end thereof to permit a strand of wire being formed into a loop about a tooth, a plunger rod slidably mounted in said casing, means for limiting the movement of said rod, a spring for forcing said rod forwardly, a trigger for holding the rod in a retracted position, means mounted on the casing for tightening the loop about the tooth, and a cutting device mounted on the outer end of said rod and operable by the release of the trigger for severing the loop from the strand.

7. In a device of the class described, the combination of a casing having guide slots at the outer end thereof and openings registering with the slots for the passage of a wire strand, a sleeve slidable on the casing, diametrically opposite lugs on the sleeve for connecting the ends of the wire thereto, said lugs being in longitudinal alinement with the slots, means for guiding the movement of the sleeve on the casing to maintain this relation between the lugs and the slots, whereby the measuring wire is retained in a horizontal position, and means carried by the casing for severing the loop from the wire strand.

8. In a device of the class described, the combination of a tubular casing, a plunger rod movable therein and carrying a cutter at its outer end, and a sleeve slidable over the casing and having means for the attachment of the ends of the measuring wire thereto.

9. The combination with a tubular casing, a sleeve slidable thereon and having means for the attachment of the ends of the measuring wire, means at the outer end of the casing for the passage and guiding of the wire, a plunger rod movable within the casing and carrying a cutter at its outer end in juxtaposition to the guiding means, a spring for projecting the rod forwardly with its outer end extended beyond the casing, and a trigger for holding the rod with its cutter in a retracted position.

10. The combination with a casing having at its outer end guide blocks with their ends projecting beyond the casing, said guide blocks being provided with diametrically opposite openings through which a wire is threaded, and said casing having diametrically opposite slots in registering relation with the openings, which slots receive the wire after it leaves the openings, a sleeve slidable on the casing and having means for the attachment of the ends of the wire at diametrically opposite points thereto, the said attaching means for the ends of the wire, the slots and the openings being in longitudinal alinement, whereby the wire is maintained in a horizontal position about the tooth when forming a loop, means for guiding the sliding movement of the sleeve on the casing and preventing rotary movement, and means for severing the wire after the formation of the loop.

11. The combination of a tubular casing, with a plunger rod movable therein and carrying a cutter at its outer end, and means mounted on the casing for connecting the ends of a wire to form a loop and permit the tightening of the latter about a tooth.

12. In a dentimeter wherein a strand is formed into a loop about a tooth, means carried by the dentimeter for tightening the loop about the tooth, and means also carried by the dentimeter for severing the strand from the loop said loop severing means being located concentrically with the loop tightening means and within the casing of the instrument.

13. In a dentimeter wherein a wire strand is formed into a loop about a tooth, the combination of a tubular casing, means mounted on the exterior thereof for tightening the loop about the tooth, and separate means arranged within the casing for severing the strand from the loop.

14. The combination with a tubular casing, means mounted on the exterior thereof for connecting the ends of a wire strand thereto, a plunger rod mounted within the casing and carrying a cutter at its outer end, said cutter normally projecting from the casing, means for limiting the longitudinal movement of the rod within the casing, a spring mounted at the inner end of the casing and acting against the rod, and a pivoted trigger carried by the inner end of the rod for holding the latter retracted against the pressure of the spring.

In testimony, that I claim the foregoing as my own, I have hereto affixed my signature in the presence of two witnesses.

WALTER BURR STRUBLE, JR.

Witnesses:
 ROBT. F. WENDLING,
 R. W. PRICE.

Copies of this patent may be obtained for five cents each, by addressing the "Commissioner of Patents, Washington, D. C."